United States Patent [19]
Cortopassi et al.

[11] Patent Number: 5,513,671
[45] Date of Patent: May 7, 1996

[54] HYDRAULICALLY CONTROLLED WATER SPOOL VALVE

[75] Inventors: Ronald J. Cortopassi, Peachtree Corners, Ga.; Lawrence P. Schmidt, Lino Lakes, Minn.; Robert W. Shallue, Blaine, Minn.; Roger N. Pearson, Elk River, Minn.

[73] Assignee: Schwing America, Inc., White Bear, Minn.

[21] Appl. No.: 274,541

[22] Filed: Jul. 13, 1994

[51] Int. Cl.⁶ .................................................. G05D 11/035
[52] U.S. Cl. ........................... 137/99; 417/228; 417/900
[58] Field of Search ............................... 137/13, 98, 99; 417/228, 900

[56] References Cited

U.S. PATENT DOCUMENTS

| | | | |
|---|---|---|---|
| 2,821,205 | 1/1958 | Chilton et al. | 137/13 |
| 3,175,571 | 3/1965 | Bankert | 137/111 |
| 3,601,079 | 8/1971 | Giles et al. | 114/67 |
| 3,608,975 | 9/1971 | Sawyer et al. | 302/14 |
| 4,510,958 | 4/1985 | Coursen | 137/13 |
| 5,066,203 | 11/1991 | Coja et al. | 137/99 |
| 5,180,294 | 1/1993 | Watchorn | 417/900 X |
| 5,361,797 | 11/1994 | Crow et al. | 137/13 |

FOREIGN PATENT DOCUMENTS 1-105100  4/1989  Japan .

*Primary Examiner*—Stephen M. Hepperle
*Attorney, Agent, or Firm*—Kinney & Lange

[57] ABSTRACT

A valve, to control the injection of lubricant into a viscous material pump pipeline is disclosed. The valve is operated off a parameter of the viscous material pump such as hydraulic fluid pressure from one or both differential/popper teed lines for the pump. The preferred valve includes coaxial water and hydraulic oil spools on opposing ends of a rod, and two hydraulic signals are used to control water flow through two outlets, to properly feed water to two lubricant injectors. Inlets and outlets of the valve are all located along one surface, and an intermediate chamber is provided to receive any leakage past the rod seals.

19 Claims, 4 Drawing Sheets

HYDRAULICALLY CONTROLLED WATER SPOOL VALVE

BACKGROUND OF THE INVENTION

This invention pertains generally to valves, and more particularly to valves for controlling lubricant injection into a viscous material flow in a pipeline.

Various pumps have been used to pump viscous materials through a pipeline. The viscous material being pumped may be homogeneous or non-homogeneous, may be compressible or incompressible, and may contain significant solid or gaseous content. Such viscous materials include in particular sludge, concrete, and similar materials. When piping such viscous materials through a pipeline, the flow generally occurs as a plug having a relatively uniform cross-sectional velocity profile. A large portion of the force required to pump the viscous material (i.e., back pressure/head loss) is due to frictional effects between the plug of material and the pipe. In order to reduce these frictional losses, lubricating fluids such as water have been added along the edge between the viscous material plug and the pipeline. Such a lubricant injection system is shown in copending application Ser. No. 08/070,516 to Crow et al. for Sludge Pipeline Lubrication System, which is incorporated herein by reference.

While the lubricant is beneficial for reducing the pressure (and power) required by the viscous material pump, the lubricant is often a substance which is undesirable in the final viscous material product. The benefit of easier pumping due to adding lubricant must be weighed against the detriment of having the lubricant in the viscous material flow. It is accordingly desired to minimize lubricant injection as much as possible while still providing the beneficial effects of the lubricant.

While viscous material lubrication systems have been effective in reducing the frictional loss of the viscous material flow, a significant lubricant pressure is needed to overcome back pressure and prevent backflow of the viscous material through the lubrication inlet. If the viscous material flow is not continuous (i.e., is not constant velocity), the back pressure provided by the viscous material to the lubrication inlet will not remain constant. Because of the varying velocity/pressure of the viscous material, neither a constant pressure nor a constant velocity flow of lubricant produces consistent lubricant application along the length of the viscous material plug. Constant velocity lubricant flow causes lubricant to be applied more heavily to locations along the viscous material plug which were stopped or moving slowly past the lubricant inlet. Constant pressure lubricant flow further adds to this problem, because the lubricant tends to flow faster when the plug is stopped or moving slower (i.e. with lower back pressure). Uncontrolled lubricant injection thus forms undesirable lubricant pockets in the viscous material. These effects are magnified if the viscous material is not of a homogenous consistency and compressibility. Accordingly, a system is desired to control lubricant injection such that it will more consistently lubricate a plug of viscous material in the pipeline.

SUMMARY OF THE INVENTION

The present invention is a valve to control the injection of lubricant into a pipeline. The valve is operated off a parameter of the viscous material pump, preferably the hydraulic fluid pressure from the differential/poppet hydraulic system for the pump. The valve may also be operated off other parameters of the viscous material pump, or off parameters of the viscous material flow. The valve has coaxial water lubricant and hydraulic pilot fluid chambers. The position of a water spool controls water flow for subsequent injection into the viscous material pipeline. The water spool is connected by a rod to a two-sided pilot piston, such that pilot fluid pressure from two sources on the pilot piston controls the position of the water spool. Inlets and outlets to the valve are all located along one surface, and the valve is provided with an intermediate chamber open to atmosphere to receive any pilot fluid or lubricant flow past the rod seals. Inspection of leakage from the intermediate chamber indicates wear of the rod seals.

While the above-identified drawing figures set forth one alternative embodiment, other embodiments of the present invention are also contemplated, some of which are noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
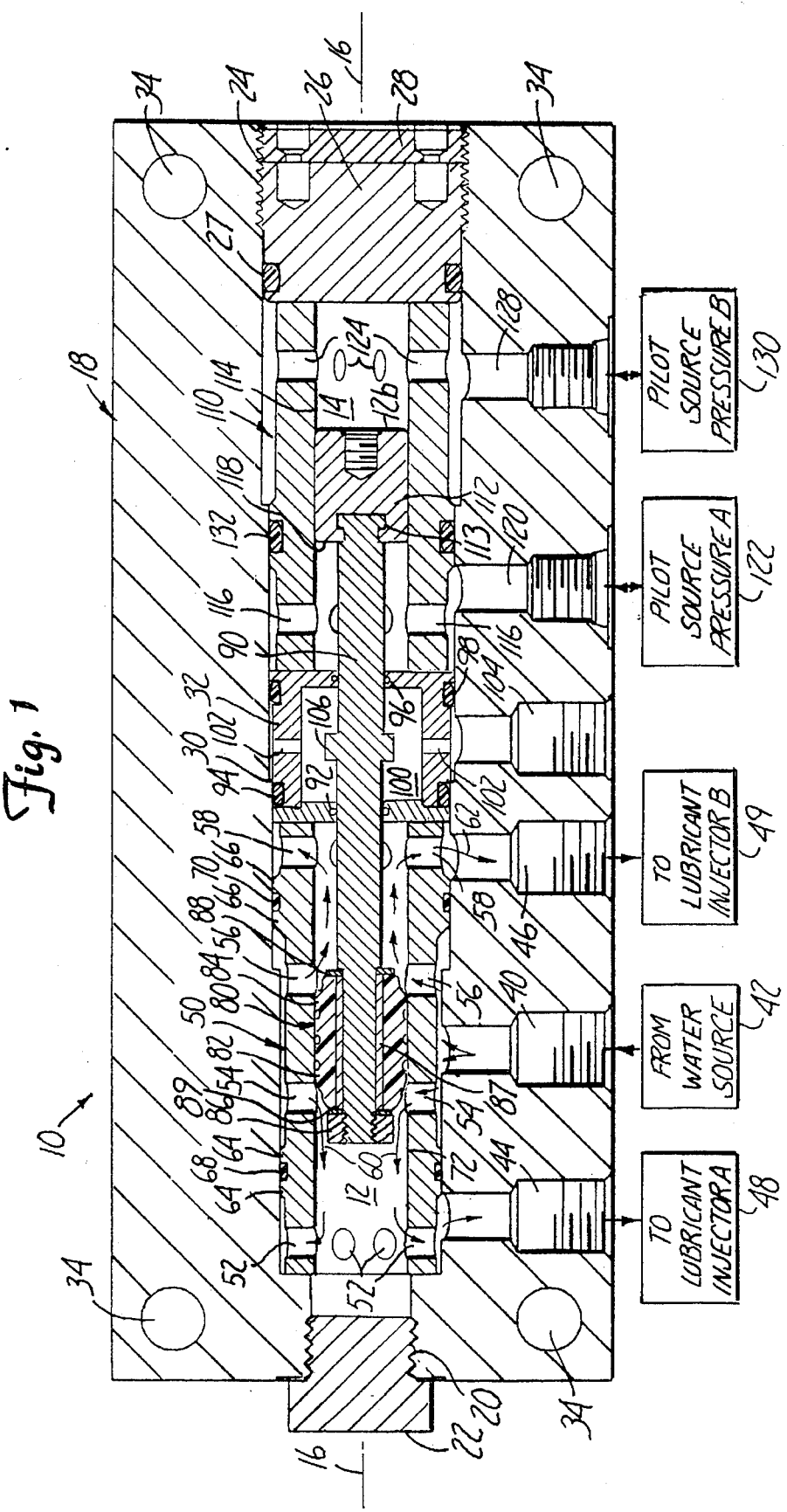
FIG. 1 is a cross-sectional view of the valve of the present invention.

As shown in FIG. 1, valve 10 includes valve body 18 which coaxially defines water chamber 12 and hydraulic oil chamber 14. The components of valve 10 are generally circular or annular about axis 16, but workers skilled in the art will appreciate that other configurations may be beneficial to their particular application. Valve body 18 has threads 20 at one end for receiving access plug 22 and threads 24 at the other end for receiving retainer plug 26 and jam ring 28. An intermediate lip 30 is located in the center of valve body 18 for proper orientation of intermediate housing 32. Additional lips may be provided such that valve body 18 proceeds from smaller diameter to larger diameter, ensuring that the internal components are assembled in proper orientation. The axial extent of water chamber 12 is defined by access plug 22 on one side and by intermediate housing 32 on the other. The axial extent of hydraulic oil chamber 14 is defined by intermediate housing 32 on one side and by retainer plug 26 on the other.

Four holes 34 through valve body 18 aid in fixturing of valve body 18 during manufacture. Holes 34 further aid in rigid attachment of valve 10 to a support structure (not shown) for use. Valve body 18 is preferably machined from stainless steel.

Figure 3:
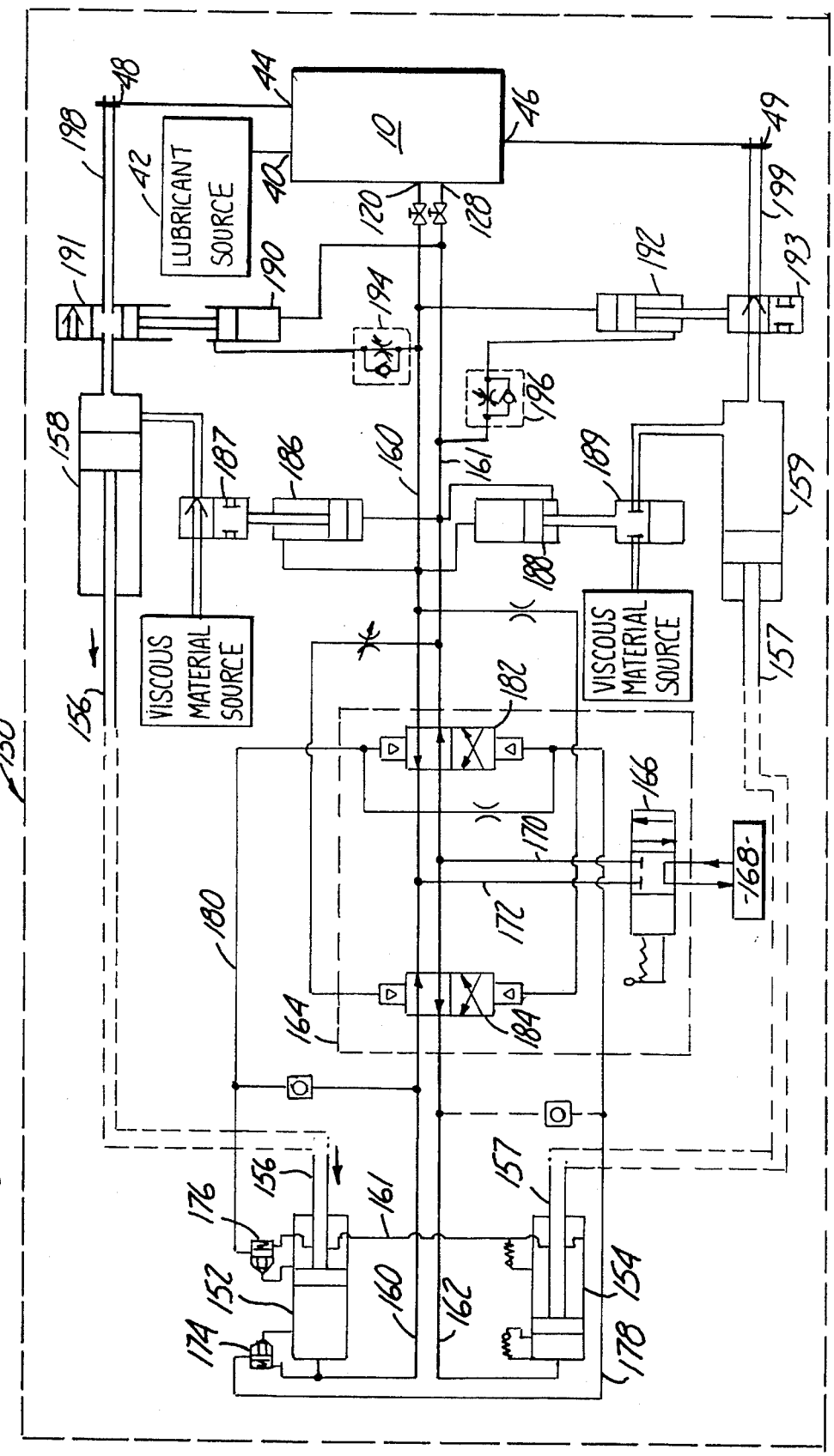
FIG. 3 is a hydraulic schematic of a lubricant injection system utilizing the valve of the present invention.

Water chamber 12 has a central water inlet 40 for connection to water source 42, and water outlets A and B 44, 46 for connection to lubricant injectors 48, 49 (also shown schematically in FIG. 3). A generally cylindrical, annular water spool cage 50 is positioned in water chamber 12. Water spool cage 50 has an outer diameter at water inlet 40 which provides an annular clearance from valve body 18.

Water spool cage 50 has a similar outer diameter at water outlets A and B 44, 46 providing annular clearances. These clearances allow water to flow around water spool cage 50 and enter or exit from all sides (rather than from only one side), even though water inlet 40 and water outlets A and B 44, 46 do not extend 360° around water spool cage 50.

The outer surface of water spool cage 50 has shoulders 64, 66 toleranced to fit closely within water chamber 12 of valve body 18. Shoulders 66 are slightly larger in diameter than shoulders 64, such that, with the profile of valve body 18, water spool cage 50 can be fully inserted into valve body 18 in only one direction. Seal 68 prevents water flow along the outside of water spool cage 50 between water inlet 40 and water outlet A 44, and seal 70 prevents water flow along the outside of water spool cage 50 between water inlet 40 and water outlet B 46.

Water spool cage 50 has four sets of axially spaced radial openings 52, 54, 56, 58. Radial openings 54, 56 are open to water inlet 40, radial openings 52 are open to water outlet A 44 and radial openings 58 are open to water outlet B 46. Radial openings 52, 54 thus define flow path 60 between water inlet 40 and water outlet A 44 through the left interior of water spool cage 50. Radial openings 56, 58 similarly define flow path 62 between water inlet 40 and water outlet B 46 through the right interior of water spool cage 50. Water spool cage 50 is preferably machined from heat-treated stainless steel.

Whether flow paths 60, 62 between water inlet 40 and water outlets A and B 44, 46 are open or closed is determined by position of water spool 80. Water spool 80 has left sealing rim 82 and right sealing rim 84 with a distance between them. In between sealing rims 82, 84 are additional ribs to make a more complete seal along the length of water spool 80. Sealing rims 82, 84 are closely toleranced to fit within and seal against inner diameter 72 of water spool cage 50. Water spool 80 is preferably fabricated from plastic to provide a non-corrosive tight seal between water spool 80 and water spool cage 50.

Locating left sealing rim 82 to the right side of radial openings 54 will allow flow path 60 to be open, and locating left sealing rim 82 to the left side of radial openings 54 will close flow path 60. Similarly, locating right sealing rim 84 to the left of radial openings 56 will open flow path 62, and locating right sealing rim 84 to the right of radial openings 56 will close flow path 62.

The distance between sealing rims 82, 84 and the distance between radial openings 54, 56 is important in that flow paths 60, 62 can be opened and closed at different times. As shown in FIG. 1, the distance between left sealing rim 82 and right sealing rim 84 is slightly less than the distance between radial openings 54 and 56. This allows valve 10 to have an intermediate position (shown in FIG. 1) wherein both flow paths 60 and 62 are open. This intermediate position prevents an abrupt change in water flow direction to avoid any hammer effect or "dead head" during switching of valve 10. The curved shape of sealing rims 80, 82 further allows a gradual changeover in flow direction during switching of valve 10.

Workers skilled in the art will appreciate that this relationship could be reversed with distance between left sealing rim 82 and right sealing rim 84 greater than the distance between radial openings 54 and 56, creating an intermediate position of spool 80 wherein both flow paths 60, 62 are closed. In either event, the worker skilled in the art can select axial locations of radial openings 54, 56 and sealing rims 82, 84 to effect a desired timing for opening and closing flow paths 60, 62.

The location of water spool 80 is driven by rod 90. Water spool 80 is attached to rod 90 such as by sleeve 87, washers 88 and 89, and nut 86. Rod 90 extends through intermediate housing 32 and into hydraulic oil chamber 14. Intermediate housing 32 has rod water seal 92, body water seal 94, rod hydraulic oil seal 96 and body hydraulic oil seal 98. Intermediate housing 32 thus effectively provides an end seal for water chamber 12 and an end seal for hydraulic oil chamber 14 with leakage chamber 100 in between. Rod water seal 92 and rod hydraulic oil seal 96, preferably made of a wear-resistant plastic, are worn by the movement of rod 90, and thus more likely to begin leaking as wear increases.

Rod 90 has larger diameter stop 106 within leakage chamber 100. Stop 106 limits the extent of axial motion of rod 90. When stop 106 is against the left wall of intermediate housing 32, water spool 80 will be positioned with flow path 62 open and flow path 60 closed. When stop 106 is against the right wall of intermediate housing 32, water spool 80 will be positioned with flow path 60 open and flow path 62 closed. When stop 106 is in an intermediate position shown in FIG. 1, water spool 80 is also in an intermediate position with both flow paths 60 and 62 open, as described above.

Leakage chamber 100 has radial openings 102 to drain outlet 104, which open leakage chamber 100 to drain outlet 104. Drain outlet 104 is preferably open to atmosphere or to a leakage collection container (not shown). Valve 10 is preferably mounted with the inlets and outlets directed downward such that any leakage in leakage chamber 100 will be gravitational expelled through drain outlet 104. As with the other inlets and outlets, drain outlet 104 is preferably threaded for easy attachment to fluid flow lines (not shown). Workers skilled in the art will appreciate that other arrangement or orientation of inlets and outlets may be preferable for their particular application, such as directing only drain outlet 104 downward and porting water chamber 12 and hydraulic oil chamber 14 through a different side of valve 10.

Rod 90 is attached to pilot piston 1 12. The outer diameter of pilot piston 112 has a slight clearance (e.g., 0.001–0.002 inches) against inner diameter 114 of pilot cage 110, allowing pilot piston 112 to slide axially within pilot cage 110. Pilot cage 110 has radial openings 116 which open left face 118 of pilot piston 112 to pilot inlet A 120 and to pilot pressure source A 122 (further shown in FIG. 3). A second set of radial openings 124 in pilot cage 110 open right face 126 of pilot piston 112 to pilot inlet B 128 and to pilot pressure source B 130 (further shown in FIG. 3). High pressure from pilot source A 122 on left face 118 of pilot piston 112 pulls rod 90 and water spool 80 to the right, opening fluid flow 60 between water inlet 40 and water outlet A 44. High pressure switching to pilot source B 130 will cause pilot piston 112, rod 90 and water spool 80 to change positions and shift to the left. The new location of water spool 80 closes fluid flow 60 between water inlet 40 and water outlet A 44, but opens fluid communication between water inlet 40 and water outlet B 46.

Workers skilled in the art will appreciate that the surface area ratio between left face 118 and right face 126 of pilot piston 112 can be selected or modified such that pilot piston 112 shifts at the appropriate pressure and that other arrangements can be adapted to properly shift pilot piston 112 and/or water spool 80. However, the system should be designed such that the net force applied to pilot piston 112 due to a hydraulic pressure change is sufficient to shift water spool 80.

Workers skilled in the art will appreciate that various alternative methods can be employed to properly have the positions of water spool 80 and pilot piston 112 change based on pilot fluid pressure. For instance, rod 90 can be constructed without stop 106, allowing water spool 80 and pilot piston 112 a greater range of axial motion. The periphery of pilot piston 112 can be constructed such that left face 118 is open to pilot source pressure A 122 even while pilot piston 112 butts up against intermediate housing 32, and such that right face 126 is open to pilot source pressure B 130 even while pilot piston 112 butts up against retainer plug 26. Similarly, other connections between pilot piston 112 and water spool 80 may be used.

Seal 132 along the outer diameter of pilot cage 110 limits fluid communication between pilot A 122 and pilot B 130. Pilot piston 112 is preferably made out of heat-treated stainless steel, as is pilot cage 110.

Retainer plug 26 has a retainer seal 27 which aids in sealing between retainer plug 26 and valve body 18. Retainer seal 27 and the other various seals 68, 70, 92, 94, 96, 98, 132 described herein may be provided by an o-ring of an elastomeric material. Workers skilled in the art will appreciate that other ways can be used to seal between the various components of the valve.

Figure 2:
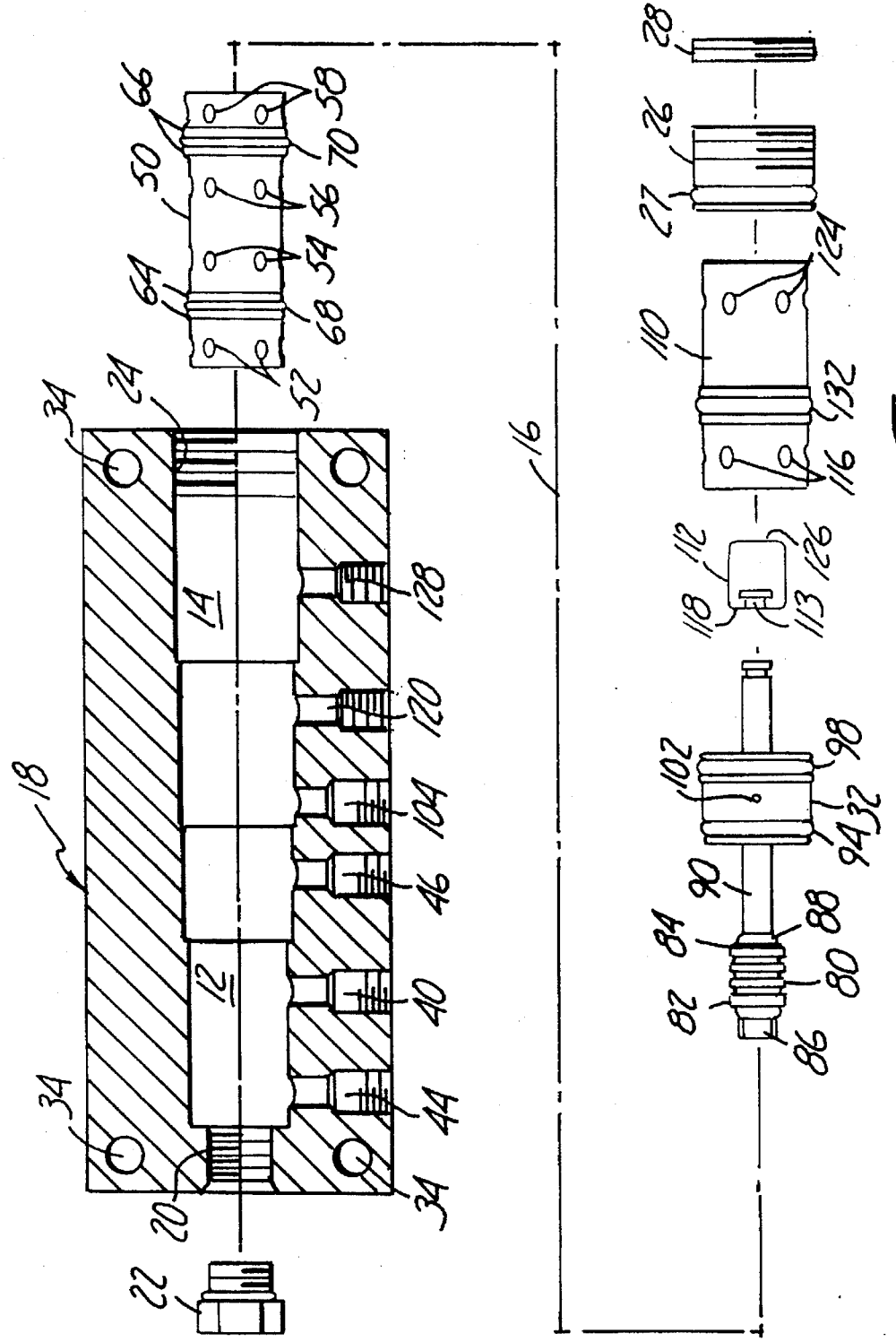
FIG. 2 is an exploded elevational view of the valve of FIG. 1.

As shown in FIG. 2, assembly of the valve is straightforward as follows. First, rod 90 and intermediate housing 32 are pre-assembled with stop 106 in intermediate housing 32. Water spool 80 is attached to rod 90 between washers 88, 89 such as by nut 86. Pilot piston 112 is slid sideways over neck 113 of rod 90 to be attached axially with respect to rod 90. Water spool cage 50 is inserted into valve body 18 as far as possible. Intermediate housing 32, assembled with rod 90, water spool 80 and pilot piston 112, is inserted into valve body 18 with water spool 80 extending into water spool cage 50 until intermediate housing 32 buts up against water spool 80. Pilot cage 110 is slid into valve body 18 over pilot piston 112. Pilot cage 110 butts up against the outer shoulder of intermediate housing 32 and is held in place by tightening of retainer plug 26 and jam ring 28.

FIG. 3 shows a hydraulic schematic for a dual viscous material pump 150 utilizing valve 10 of the present invention. Viscous material pump 150 has switching differential cylinder 152 and check valve differential cylinder 154. Each differential cylinder 152, 154 powers rod/piston 156, 157 for driving a pumping cylinder 158, 159 for viscous material. (Rod/pistons 156, 157 are shown in dashed lines elongated and bent in the schematic of FIG. 3, but each merely represents a simple continuous rod between a hydraulic piston and a material piston).

The schematic of FIG. 3 shows material cylinder 159 in a pumping stroke and material cylinder 158 in a filling stroke. High differential/poppet pressure on feed line 162 causes check valve cylinder 154 (and material cylinder 159) to undergo a pumping stroke. As check valve cylinder 154 extends, pressure off the rod side of check valve cylinder 154 through rocking/slave line 161 causes switching cylinder 152 (and material cylinder 158) to undergo a filling stroke. Conversely, reversing high and low differential/ poppet pressures on teed lines 160, 162 causes switching cylinder 152 (and material cylinder 158) to undergo a pumping stroke and check valve cylinder 154 (and material cylinder 159) to undergo a filling stroke.

Switching of high and low differential/popper pressure on feed lines 160 and 162 occurs through control block 164. When power to viscous material pump 150 is turned on, control valve 166 connects differential/poppet fluid pump 168 to system feed lines 170, 172 pushing rod/piston 156 as shown. Switching valve 174, with low pressure on both sides, is closed, and switching valve 176, with high pressure on both sides, is closed. When rod/piston 156 completes its travel, switching valve 174 will have high pressure on the rod side and low pressure on the piston side, causing switching valve 174 to open. Switching line 178, now open to the system high pressure, has higher pressure than switching line 180 and causes control valve 182 to change positions. This change in turn causes control valve 184 to change positions, and high and low pressure to feed lines 160, 162 is reversed. The system reverses likewise when piston/rod 156 completes its travel in the other direction.

Suction poppet cylinders 186, 188 and discharge poppet cylinders 190, 192 are similarly operated off the differential/ popper feed lines 160, 162. As shown in FIG. 3, high pressure on teed line 162 causes suction popper cylinder 186 to open intake valve 187 so that material cylinder 158 takes in material from a viscous material source during the filling stroke. Discharge poppet cylinder 190 meanwhile has discharge valve 191 closed until differential/poppet pressure is released and material cylinder 158 is pumping. Suction poppet cylinder 188 and discharge poppet cylinder 192 operate similarly to properly open and close inlet valve 189 and discharge valve 193. In this way, viscous material cylinders 158, 159 alternate pumping material through the viscous material pipelines 198, 199. Throttle check valves 194, 196 ensure that discharge valves 191, 193 are not opened prematurely during the material pumping stroke.

Valve 10 operates off the hydraulic pressure in hydraulic feed lines 160, 162 near discharge poppet cylinders 190, 192. While hydraulic pressure for valve 10 is shown taken from this location, it is readily apparent that hydraulic pressure could be drawn anywhere out of the system to reflect various parameters of the pump. For example, hydraulic pressure for valve 10 could be taken from differential cylinder pressure, suction poppet cylinder pressure, as part of the switching pressure for differential cylinders, or from discharge valve cylinder pressure. Each of these various options may have high pressure timing which is slightly different, such as is caused by throttle check valves 194, 196 or other methods. Switching of pilot pressures to valve 10 could further be accomplished through electrical solenoids and other means related to operation of the pump, such as through measuring of the pressure or flow in viscous material pipeline 198, 199 itself. In any of these configurations, water will only be injected through lubricant injectors 48, 49 at proper, desired time intervals during the viscous material flow through respective pipelines 198, 199. Workers skilled in the art will recognize that valve 10 and the system disclosed can readily be modified to operate off single or multiple viscous material sources, off single or multiple viscous material pumping cylinders, off single or multiple pilot pressures, and off single or multiple viscous material pipelines.

Figure 4:
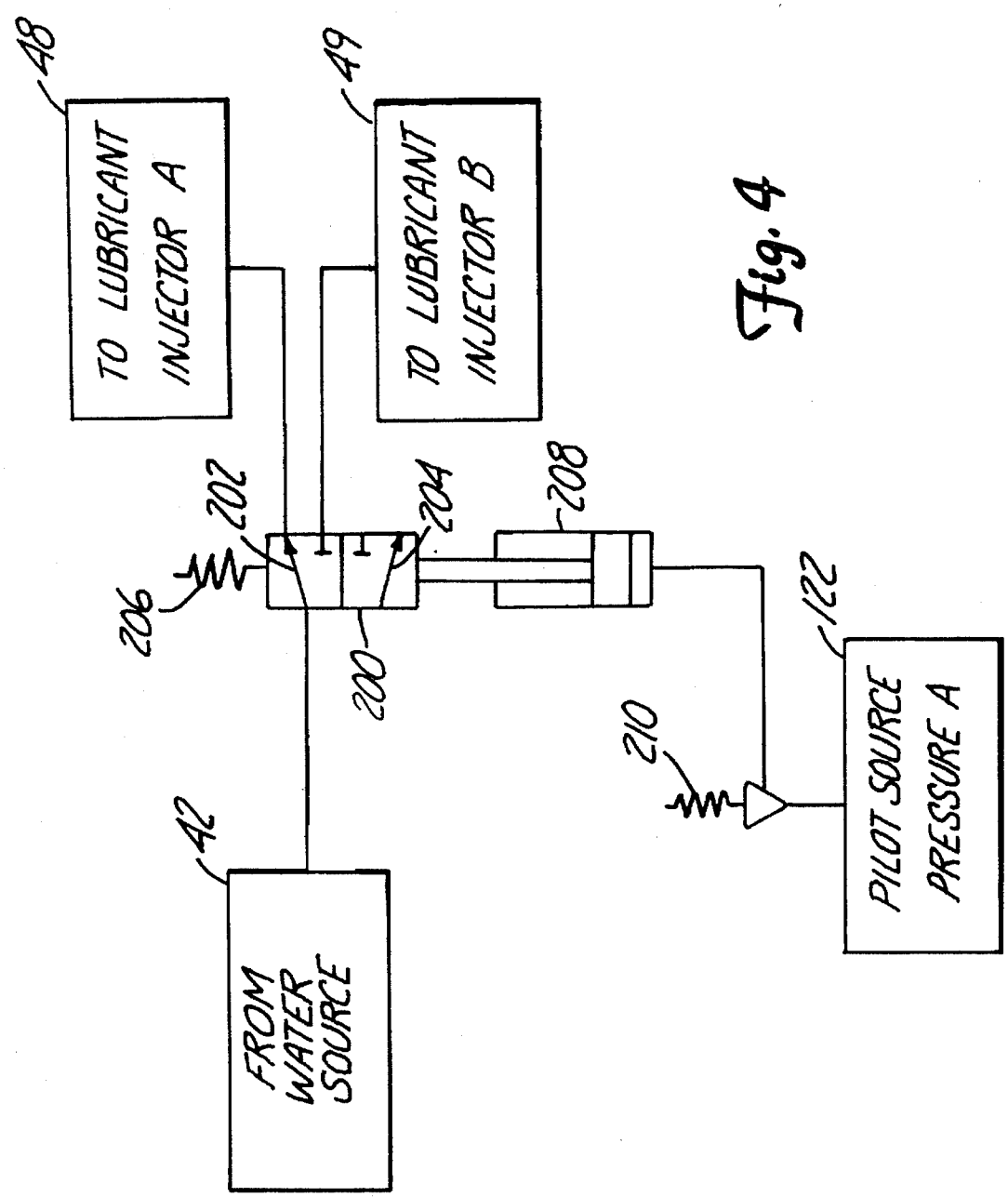
FIG. 4 is a hydraulic schematic of an alternative embodiment valve of the present invention.

Alternative valves may be useful for supplying lubricant to one or more lubricant injectors based on a parameter of the viscous material pump or flow. For instance, as shown in the hydraulic schematic of FIG. 4, a spring loaded spool valve 200 may be used. Valve 200 has two alternate flow paths 202, 204. In the position shown, flow path 202 directs water from water source 42 to lubricant injector A 48. Spring 206 provides sufficient pressure to maintain valve 200 in this position during a low pressure signal from pilot source pressure A 122.

A high pressure signal from pilot source pressure A 122 changes the position of valve 200. The high pressure signal causes cylinder 208 to extend, compressing spring 206 and connecting water source 42 to lubricant injector B 49 through flow path 204. Back pressure valve 210 prevents valve 200 and cylinder 208 from shifting during minor variations of the low pressure signal. Such minor variations in low pressure might occur, for instance, when feed line 160 is returning hydraulic oil to differential/popper fluid pump 168 (See FIG. 3). Workers skilled in the art will recognize that other types of valve configurations might also be used to control lubricant injection based on a parameter of the viscous material pump or viscous material flow.

Although the present invention has been described with reference to preferred embodiments, workers skilled in the art will recognize that considerable changes may be made in form and detail without departing from the spirit and scope of the invention. For instance, workers skilled in the art will appreciate that the valve is equally useful for lubricant fluids other than water and for pilot fluids other than hydraulic fluid or can readily be modified to handle such alternative fluids. Similarly, the size of various components can be modified to fit a particular application. In particular, leakage chamber 100 may be sized only slightly larger than rod 90, as flow within leakage chamber 100 should be minimal.

What is claimed is:

1. A valve for controlling the injection of lubricant into a viscous material pipeline, flow of the viscous material in the pipeline being provided by a pump, comprising:

a lubricant inlet which is open to a pressurized lubricant supply;

a first lubricant outlet which is in intermittent fluid communication with the lubricant inlet, the timing of the intermittency being based on a parameter related to operation of the viscous material pump, the first lubricant outlet being connectable to the viscous material pipeline; and a second lubricant outlet which is in intermittent fluid communication with the lubricant inlet, the timing of the intermittency being based on a parameter of the viscous material pump, the second lubricant outlet being connectable to the viscous material pipeline.

2. The valve of claim 1 wherein the first lubricant outlet and the second lubricant outlet are in alternating fluid communication with the lubricant inlet.

3. The valve of claim 2 wherein the lubricant is water.

4. The valve of claim 2 wherein the parameter is the timing of a pumping stroke of the viscous material pump.

5. The valve of claim 2 wherein the parameter is a pressuring of hydraulic fluid.

6. The valve of claim 2 wherein the parameter is a pressuring of viscous material.

7. The valve of claim 2 wherein the parameter is a flow of viscous material.

8. A valve for controlling the injection of lubricant into a viscous material pipeline, flow of the viscous material in the pipeline being provided by a pump, comprising:

a lubricant inlet which is open to a pressurized lubricant supply;

a first lubricant outlet which is in intermittent fluid communication with the lubricant inlet, the timing of the intermittency being based on a parameter related to operation of the viscous material pump, the first lubricant outlet being connectable to the viscous material pipeline;

wherein the parameter is an opening of a viscous material pump discharge valve.

9. The valve of claim 1 further comprising:

a spool having two positions to provide the intermittent fluid communication;

a spring which normally biases the spool into a position which closes fluid communication between the lubricant inlet and the first lubricant outlet; and means for changing the position of the spool based on the parameter.

10. A system for pumping a viscous material through a pipeline comprising:

a pump which causes viscous material flow in a first line of the pipeline and causes viscous material flow in a second line of the pipeline; and a lubrication system comprising:
       a first lubrication injection port into the first line of the pipeline:
       a second lubrication injection port into the second line of the pipeline;
       a lubricant valve for controlling the injection of lubricant through the first lubrication injection port and through the second lubrication injection port,
       a first lubricant line connecting the lubricant valve to the first lubrication injection port; and
       a second lubricant line connecting the lubricant valve to the second lubrication injection port, wherein opening and closing of the lubricant valve from the first lubricant line to the first lubrication injection port is based on a parameter related to operation of the viscous material pump.

11. The system of claim 10 wherein the lubrication system further comprises:

a lubricant supply line providing pressurized lubricant to the lubricant valve.

12. The system of claim 10 wherein the lubricant is water.

13. The system of claim 10 wherein the viscous material is sludge.

14. The system of claim 10 wherein the viscous material is concrete.

15. The system of claim 10 wherein the rate of the viscous material flow caused by the pump is inconstant.

16. The system of claim 10 wherein:

a pumping stroke of the pump causes viscous material flow in the first line; and the parameter is the timing of the pumping stroke of the pump.

17. The system of claim 10 wherein:

the pump comprises a hydraulic chamber, and a pressuring of hydraulic fluid in the hydraulic chamber causes viscous material flow in the first line; and the parameter is the pressuring of hydraulic fluid.

18. The system of claim 17 further comprising:

a hydraulic line which makes hydraulic fluid connection between the hydraulic chamber and the lubricant valve such that high hydraulic fluid pressure opens the lubricant valve.

19. A system for pumping a viscous material through a pipeline comprising:

a pump which causes viscous material flow in a first line of the pipeline, wherein the pump comprises a viscous material discharge valve, and opening of the viscous material discharge valve indicates viscous material flow in the first line; and a lubrication system, the lubrication system comprising:
       a first lubrication injection port into the first line of the pipeline;
       a lubricant valve for controlling the injection of lubricant through the first lubrication injection port; and
       a first lubricant line connecting the lubricant valve to the first lubrication injection port, wherein opening and closing of the lubricant valve from the first lubricant line to the first lubrication injection port is based on the opening of the viscous material discharge valve.

* * * * *

UNITED STATES PATENT AND TRADEMARK OFFICE
CERTIFICATE OF CORRECTION

PATENT NO. : 5,513,671

DATED : May 7, 1996

INVENTOR(S) : RONALD J. CORTOPASSI, LAWRENCE P. SCHMIDT, ROBERT W. SHALLUE, ROGER N. PEARSON

It is certified that error appears in the above-indentified patent and that said Letters Patent is hereby corrected as shown below:

Title page, [57] in the Abstract, line 4, delete "popper", insert --poppet--; line 5, delete "teed", insert --feed--

Col. 4, line 38, delete "1 12", insert --112--

Col. 5, line 57, delete "popper", insert --poppet--

Col. 5, line 57, delete "teed", insert --feed--

Col. 5, line 61, delete "popper", insert --poppet--

Col. 6, line 14, delete "popper", insert --poppet--

Col. 6, line 15, delete "teed", insert --feed--; delete "popper", insert --poppet--

Col. 7, line 2, delete "popper", insert --poppet--

Signed and Sealed this

Thirtieth Day of July, 1996

Attest:

BRUCE LEHMAN

*Attesting Officer*  *Commissioner of Patents and Trademarks*